Patented Oct. 29, 1929

1,733,268

UNITED STATES PATENT OFFICE

LUCAS P. KYRIDES, OF BUFFALO, NEW YORK, ASSIGNOR TO NATIONAL ANILINE & CHEMICAL CO., INC., OF NEW YORK, N. Y., A CORPORATION OF NEW YORK

PRODUCTION OF SIDE-CHAIN HALOGEN SUBSTITUTION PRODUCTS OF AROMATIC COMPOUNDS

No Drawing.   Application filed July 8, 1925.   Serial No. 42,314.

This invention relates to the halogenation of alkyl side-chains in aromatic compounds of the benzene series, particularly the hydrocarbons. It relates more particularly to the chlorination of toluene for the production of side-chain halogen substitution products thereof, especially benzyl chloride.

It is well-known that in the action of a halogen having an atomic number between 17 and 35 inclusive, i. e., chlorine or bromine, upon aromatic hydrocarbons which contain an alkyl side-chain, e. g., toluene, substitution may occur in the nucleus or in the side-chain, or both, according to the conditions under which the reaction is carried out. Aside from certain physical conditions, such as temperature, the presence or absence of certain forms of actinic energy, etc., it is further known that the reaction is particularly affected by the presence or absence of certain catalysts and, generally speaking, catalysts comprised of metals or of metallic salts, if present, tend to favor the introduction of halogen into the nucleus rather than into the side-chain.

In the production of side-chain halogen substitution products, such as benzyl chloride, benzal chloride or benzotrichloride by the chlorination of toluene, and in order to minimize the formation of nuclear substitution products, such reactions have heretofore been carried out in non-metallic vessels or containers both in laboratory and plant practice. So far as I am aware, glass containers alone have been used for this purpose.

The present invention contemplates the production of side-chain halogen substitution products of the benzene series by carrying out the process of halogenation in lead or lead-lined vessels or containers, and particularly wherein substantially pure lead is employed, and in the presence or absence of suitable catalysts such as, for example, sulfur, selenium or phosphorus, or their halides (i. e., chlorides or bromides), and others known to the art.

The use of lead substantially free from antimony has been found to be particularly advantageous; but other impurities, such as those which favor the introduction of halogen into the benzene nucleus, e. g., arsenic, iron, tin, copper, etc., should be substantially absent. Even the presence of these or similar impurities in such other parts of the container or apparatus, as valves, pipes, etc., as come in contact with the reaction mixture at any time during the operation of the process is to be avoided.

The use of lead instead of glass vessels, particularly in large scale production, permits the employment of large containers, minimizes loss from breakage, and makes unnecessary the employment of the expensive and bulky apparatus heretofore used.

The following examples will further illustrate the invention, but it is understood that the invention is not limited thereto. The parts are by weight.

*Example 1.*—To 1850 parts of dry filtered toluene contained in a lead vessel provided with a lead cooling or heating coil and a lead reflux condenser, the parts made of lead being substantially free from antimony and other impurities, there is added 25 parts of phosphorus trichloride. The mixture is heated and maintained at a temperature of about 102°–105° C. and dry chlorine is introduced through a perforated pure lead coil at such a rate that most or all of it is absorbed and until the specific gravity of the mixture reaches about 0.985 to 1.01 at 25° C. Usually about 600 to 675 parts of chlorine are required. The final liquid thus obtained contains about 1000 parts of unchanged toluene and about 1000 parts of benzyl chloride which for the most part can be separated and recovered in a substantially pure state by any suitable and well-known method.

In order to diminish the loss of chlorine by non-absorption, and of toluene by volatilization or entrainment in the hydrochloric acid evolved, it is preferable to carry out the chlorination in several lead-lined vessels arranged in series. Further, in order to avoid the production of more highly chlorinated derivatives, it is preferable to carry out the process so that only about one-half to three-fourths of the toluene is chlorinated.

In the above example, the introduction of chlorine may be continued until benzal chloride and finally benzotrichloride becomes the major product produced, suitable well-known temperatures being employed. It is obvious that benzyl chloride may be used as the initial material for the production of benzal chloride, and the latter for benzotrichloride.

Further, bromine may be used in place of chlorine provided bromine derivatives are desired. The halogenation may be effected in the presence of other suitable catalysts, such as sulfur or selenium, or their halides, in place of phosphorus or its halides. It may also be effected in conjunction with various forms of actinic energy, such as diffused or direct sunlight, or the ultraviolet rays of the quartz mercury lamp, etc. In place of toluene, other alkyl derivatives of benzene may be used, e. g., xylene, mesitylene, etc.

*Example 2*.—To 1850 parts of dry and filtered o-chlortoluene contained in a cast-iron vessel lined throughout with substantially pure lead and provided with a pure lead cooling or heating coil and a pure lead reflux condenser, there is added 45 parts of phosphorus trichloride. The mixture is heated to about 110°–120° C. and through a perforated pure lead coil there is introduced chlorine at such a rate that the temperature gradually rises, due to the heat of reaction, to about 150°–160° C. during a period of about 60 to 72 hours. Usually about 700 parts chlorine are introduced in every 24 hours in maintaining the preferable conditions. Chlorine is introduced until the specific gravity of the solution is about 1.405–1.407 at 15° C. About 2200 parts of chlorine are required, and the solution then contains about 1850–1900 parts of o-chlorbenzalchloride and, as a by-product, about 225–250 parts of o-chlorbenzotrichloride. The o-chlorbenzal chloride and o-chlorbenzotrichloride may be recovered and separated by any suitable and well-known manner. Or the mixture may be hydrolized whereby the o-chlorbenzalchloride is converted into o-chlorbenzaldehyde and the o-chlorbenzotrichloride into o-chlorbenzoic acid and then either or both of them recovered in any well-known or suitable manner.

In a similar manner, other nuclear halogen substitution products of toluene, e. g., p-chlortoluene, etc., may be halogenated for the introduction of halogen in the methyl group.

It will thus be seen that the present invention is primarily concerned with the halogenation of side-chain aromatic hydrocarbons of the benzene series for the production of derivatives containing halogen substituted in the side-chain, the process of halogenation being carried out in lead or lead-lined vessels or containers, and particularly wherein the lead is pure, i. e., substantially free from antimony and from other impurities which favor the introduction of halogen into the nucleus.

It will be further noted that the process of halogenation may be carried out in lead containers in the presence or absence of catalysts; but if catalysts are present, the present invention includes only such as are favorable to side-chain halogenations.

It will be further noted that the present invention is applicable to the further halogenation of partly or incompletely halogenated side-chains in aromatic compounds, for example, the chlorination of benzyl chloride for the production of benzal chloride and of benzal chloride for the production of benzotrichloride by the introduction of halogen until these products become the major ingredients. Further, the process may be employed at ordinary, diminished or super-atmospheric pressures and in the presence or absence of inert solvents or diluents.

In the claims it will be understood that the term "pure lead" denotes lead substantially free from impurities or other ingredients or constituents. It will be further understood that the term "toluene compound" denotes and includes toluene and its nuclear halogenated derivatives, and in which the methyl group may or may not be partially halogenated; that the terms "benzene hydrocarbon containing an alkyl side-chain" and "benzene compound containing an alkyl side-chain" denote and include, respectively, such as will produce by direct halogenation a side-chain halogen substitution product, it being intended that the term "alkyl side-chain" includes such as may or may not be already partially halogenated unless otherwise stated.

I claim:

1. In the production of side-chain halogen substitution products by inducing a reaction between a halogen whose atomic number is between 17 and 35 inclusive and a benzene compound containing an alkyl side-chain, the process which comprises conducting the reaction in a lead container substantially free from impurities which favor introduction of halogen into the benzene nucleus.

2. In the production of side-chain halogen substitution products by inducing a reaction between a halogen whose atomic number is between 17 and 35 inclusive and a benzene hydrocarbon containing an alkyl side-chain, the process which comprises conducting the reaction in a lead container substantially free from arsenic, antimony and iron.

3. In the production of side-chain halogen substitution products by inducing a reaction between a halogen whose atomic number is between 17 and 35 inclusive and a benzene hydrocarbon containing an alkyl side-chain, the process which comprises conducting the reaction in a substantially pure lead container.

4. In the production of side-chain halogen substitution products by inducing a reaction between a halogen whose atomic number is between 17 and 35 inclusive and a toluene compound the method which comprises conducting the reaction in a lead container substantially free from impurities which favor introduction of halogen into the benzene nucleus.

5. In the production of side-chain halogen substitution products by inducing a reaction between a halogen whose atomic number is between 17 and 35 inclusive and a toluene compound, the process which comprises conducting the reaction in a substantially pure lead container, and in the presence of a catalyst favorable to side-chain halogenation.

6. In the production of side-chain halogenation substitution products by inducing a reaction between a halogen whose atomic number is between 17 and 35 inclusive and a toluene compound, the process which comprises conducting the reaction in a substantially pure lead container, and in the presence of a catalyst selected from the group consisting of sulfur, selenium, phosphorus and their halides.

7. In the production of side-chain halogen substitution products by inducing a reaction between a halogen whose atomic number is between 17 and 35 inclusive and a toluene compound, the process which comprises conducting the reaction in a lead vessel substantially free from antimony, and in the presence of a catalyst selected from the group consisting of phosphorus and its halides.

8. In the production of side-chain chlorine substitution products by inducing a reaction between chlorine and a toluene compound, the process which comprises conducting the reaction in a lead container substantially free from impurities which favor introduction of halogen into the benzene nucleus, and in the presence of a catalyst selected from the group consisting of phosphorus and its chlorides.

9. In the production of side-chain chlorine substitution products by inducing a reaction between chlorine and toluene, the process which comprises conducting the reaction in a lead container substantially free from impurities which favor introduction of halogen into the benzene nucleus.

10. In the production of side-chain chlorine substitution products by inducing a reaction between chlorine and toluene, the process which comprises conducting the reaction in a lead container substantially free from arsenic, antimony and iron.

11. In the production of side-chain chlorine substitution products by inducing a reaction between chlorine and toluene, the process which comprises conducting the reaction in a substantially pure lead container, and in the presence of a catalyst selected from the group consisting of phosphorus and its chlorides.

12. The process which comprises inducing a reaction between chlorine and toluene until a product is obtained in which benzyl chloride is the major ingredient, the reaction being conducted in a lead container substantially free from impurities which favor introduction of chlorine into the benzene nucleus.

13. A process which comprises the halogenation of alkyl side-chains of benzene hydrocarbons in substantially pure lead containers.

14. In the production of side-chain halogen substitution products by inducing a reaction between toluene and a halogen having an atomic number between 17 and 35 inclusive, the process which comprises conducting the reaction in a lead container which is substantially free from arsenic, antimony and iron.

15. In the production of benzyl chloride, the process which comprises subjecting toluene to the action of chlorine in the presence of phosphorus chloride until approximately 45.5 per cent of the toluene has been chlorinated, the reaction being carried out in a lead container which is substantially free from arsenic, antimony and iron.

In testimony whereof I affix my signature.
LUCAS P. KYRIDES.